United States Patent
Siebert et al.

(10) Patent No.: US 10,023,773 B2
(45) Date of Patent: Jul. 17, 2018

(54) ADHESIVES, UV-CROSSLINKABLE PSAS AND BONDING AGENTS WITH UV-CROSSLINKED PSAS

(71) Applicant: TESA SE, Hamburg (DE)

(72) Inventors: Michael Siebert, Schenefeld (DE);
Alexander Prenzel, Hamburg (DE);
Inga Auktun, Norderstedt (DE);
Jennifer Beschmann, Jiangsu (CN)

(73) Assignee: TESA SE, Norderstedt (DE)

( * ) Notice: Subject to any disclaimer, the term of this patent is extended or adjusted under 35 U.S.C. 154(b) by 587 days.

(21) Appl. No.: 14/683,376

(22) Filed: Apr. 10, 2015

(65) Prior Publication Data
US 2015/0299530 A1 Oct. 22, 2015

(30) Foreign Application Priority Data

Apr. 16, 2014 (DE) ............ 10 2014 207 364

(51) Int. Cl.
*C09J 133/00* (2006.01)
*C09J 133/08* (2006.01)
(Continued)

(52) U.S. Cl.
CPC ............ *C09J 133/08* (2013.01); *C08F 220/06* (2013.01); *C09J 7/21* (2018.01); *C09J 7/38* (2018.01); *C09J 133/02* (2013.01); *D06M 17/04* (2013.01); *D21H 19/00* (2013.01); *C08F 2220/1808* (2013.01); *C08L 2312/06* (2013.01); *C09J 2203/302* (2013.01); *C09J 2400/263* (2013.01); *C09J 2433/00* (2013.01)

(58) Field of Classification Search
CPC ........ C09J 133/08; C09J 7/045; C09J 133/02; C09J 2203/302; C09J 2400/263; C09J 2433/00; C09J 7/041; C08L 2312/06; D06M 17/04; D21H 19/00
See application file for complete search history.

(56) References Cited

U.S. PATENT DOCUMENTS 7,183,334 B2 * 2/2007 Guzauskas ............ A61K 6/083
433/228.1
7,964,249 B2 6/2011 Cartellieri et al.
(Continued)

FOREIGN PATENT DOCUMENTS

CA 2 546 822 A1 7/2005
CN 19 10247 A 2/2007
(Continued)

OTHER PUBLICATIONS

English Translation of Chinese Search Report issued by the Chinese Patent Office in corresponding application No. 201510181188.9.
(Continued)

*Primary Examiner* — Cephia D Toomer
(74) *Attorney, Agent, or Firm* — Norris McLaughlin & Marcus P.A.

(57) ABSTRACT

Adhesives and pressure-sensitive adhesives comprising polymerization products of acrylates, the adhesives being meltable and comprising polymerization products of esters of (meth)acrylic acid and (meth)acrylic acid, the polymerization product having a molecular weight Mn of greater than 50 000 g/mol and Mw of greater than 500 000 g/mol.

21 Claims, 7 Drawing Sheets

(51) Int. Cl.
*C09J 133/02* (2006.01)
*D06M 17/04* (2006.01)
*D21H 19/00* (2006.01)
*C08F 220/06* (2006.01)
*C09J 7/38* (2018.01)
*C09J 7/21* (2018.01)
*C08F 220/18* (2006.01)

(56) References Cited

U.S. PATENT DOCUMENTS

| | | |
|---|---|---|
| 2004/0048944 A1 | 3/2004 | Cartellieri et al. |
| 2006/0155000 A1* | 7/2006 | Inenaga ............... B32B 7/12 522/6 |
| 2008/0286485 A1 | 11/2008 | Zollner et al. |
| 2015/0148444 A1 | 5/2015 | Prenzel et al. |

FOREIGN PATENT DOCUMENTS

| | | |
|---|---|---|
| DE | 10208843 * | 9/2003 |
| DE | 10 2004 002279 A1 | 8/2005 |
| EP | 1 548 080 A1 | 6/2005 |
| EP | 1 370 590 B1 | 10/2006 |
| EP | 2 143 773 A1 | 1/2010 |
| WO | 02/28963 A2 | 4/2002 |

OTHER PUBLICATIONS

English Translation of Chinese Office Action issued by the Chinese Patent Office in corresponding application No. 201510181188.9.
European Search Report dated Sep. 4, 2015.
German Search Report dated Oct. 27, 2014.

* cited by examiner

ADHESIVES, UV-CROSSLINKABLE PSAS AND BONDING AGENTS WITH UV-CROSSLINKED PSAS

The invention relates to adhesives and pressure-sensitive adhesives (PSAs) comprising polymerization products of acrylates, the adhesives being meltable and comprising polymerization products of esters of (meth)acrylic acid and (meth)acrylic acid, the polymerization product having a molecular weight Mn of greater than 50 000 g/mol and Mw of greater than 500 000 g/mol. The invention further relates to UV-crosslinkable and meltable PSAs and also to a process for preparing them, and to the production of bonding agents, such as cable wrapping tapes.

BACKGROUND OF THE INVENTION

Within industry, adhesive tapes have long been used for producing cable looms. In this application, the adhesive tapes serve to bundle a multiplicity of electrical leads prior to installation or in the already assembled state, in order, by bandaging them, to reduce the space taken up by the bundle of leads, and also to achieve additional protective functions.

Within the motor vehicle industry, adhesive tapes for cable cladding are tested and classified according to extensive banks of standards, such as, for example, LV 312-1, "Protective systems for lead harnesses in motor vehicles, adhesive tapes; testing guidelines" (October 2009), as a joint standard from the companies Daimler, Audi, BMW and Volkswagen, or the Ford specification ES-XU5T-1A303-aa (revised version of September 2009) "Harness Tape Performance Specification".

In widespread use are cable wrapping tapes with film carriers and textile carriers, coated generally on one side with various pressure-sensitive adhesives. As well as a range of requirements, such as chemical compatibility, high bond strength, compatibility with changing substrates, that are imposed on adhesive tapes, it must also be ensured in the motor vehicle industry that uneven, non-uniform substrates are reliably bonded by the cable runs, convoluted tubes, and branches. Other factors are flexural and tensile stresses in the course of production, installation and subsequent use within the engine compartment of a motor vehicle, or else in the vehicle body, with continual flexural stress during the opening of doors.

Since the end of the adhesive tape is ideally bonded to its own reverse face, there must be good instantaneous bond strength (tack) to this substrate, so that flagging of the adhesive tape does not occur at the start. In order to ensure a flagging-free product durably, the anchoring on the substrate and the internal strength of the adhesive must both be such that the adhesive bond is robust even under the effect of tension (tensile and flexural stressing).

Flagging—in the context of an adhesive tape wound around a body—refers to the tendency of one adhesive tape end to stand up. The reason lies in the combination of holding force through the adhesive, the stiffness of the carrier, and the diameter of the cable harness.

Determining the flagging resistance of wire harnessing (WH) cable wrapping tapes is done via the TFT (Threshold Flagging Time) method. The target variable for an outstandingly flagging-free woven fabric product is defined with a limiting value of well above 1000 min TFT, preferably above 2000 min TFT.

The realization of easy-unwind WH adhesive tapes in conjunction with retention of good technical adhesive properties poses a major challenge, since the two properties appear to be mutually exclusive: the key criteria for single-side bonding cable wrapping tapes, with adapted unwind force and sufficiently high bond strength, are in flat contradiction with one another. Whereas good flow-on behaviour and anchoring behaviour on the part of the PSA are prerequisites for good bond strength values and an associated low flagging potential, these criteria are more of a hindrance to convenient unwind performance.

EP 1 548 080 A1 discloses industrial adhesive tapes having a filler content of 10% for use in construction, the tapes being based on AcResin Polymers having molecular weight of an estimated 200 000 g/mol and also on further additions such as flame retardants. Up to 10% of fillers may be present. There is no reference to the possibility of use in the motor vehicle sector under the aforementioned ambient conditions, such as the high temperature.

EP 1 370 590 B1 (WO 02/28963 A2) discloses a process for preparing highly crosslinked acrylate hotmelt PSAs from amide-functional acrylates. Further disclosed is a process for producing a UV-crosslinkable acrylate composition.

Known under the AcResin trade name are unblended polyacrylates with molecular weights Mw of around 200 000 to 300 000 g/mol. As a result of this it is necessary to enable sufficiently high cohesion through the UV crosslinking, though at the same time there is a considerable drop in adhesion because of the high degree of crosslinking.

Specifically in relation to flagging behaviour, however, it is important to bring about a balance between cohesion and adhesion. Even at low UV doses, the unblended AcResin composition is too heavily crosslinked, resulting in a very small processing window and/or ruling out the possibility of varying the product by altering the machine parameters.

In order to make this possible, it is known for the AcResin to be blended with resins, for example.

In order to bring about the desired properties in the PSAs, the known acrylate polymers can be admixed with standardized blends. The purpose of the blended polymers is to increase the adhesion. The cohesion is not significantly improved at the same time. For that purpose, preference is given to using resins having a low softening point (rosins, for example). On account of the modulus of elasticity, which drops greatly as a result, the cohesion of the adhesive is lowered. With the objective of improving the cohesion, resins having a very high softening point are used, for example (for example, terpene-phenolic resins having a softening point >115° C.), leading to an improvement in the cohesion. While the modulus of elasticity is likewise lowered, it is nevertheless compensated by the sharper increase in glass transition temperature. At the same time, however, there is a deterioration in the flow-on behaviour, owing to the high resulting glass transition temperature by comparison with the unblended adhesive. Accordingly it becomes very difficult to ensure that the balance of adhesion and cohesion is constant over time. Such a balance is of great importance for WH cable winding tapes, especially for the setting of a stable unwind force.

The selection of the resins is likewise greatly restricted, since the majority of resins absorb in the UV range and therefore higher doses are needed in order to achieve an even degree of crosslinking. This is a disadvantage, since the higher UV dose may significantly increase the thermal input into the carrier, with the possible consequent need for extensive cooling in order to prevent the carrier contracting. On the processing side, it may be necessary to lower the belt speed in order to be able to achieve the required UV dose and/or to dissipate the thermal energy. Resins with high UV absorption may lead to very sharp crosslinking gradients, meaning that the anchoring on the woven fabric is no longer ensured.

A further possibility for modification lies in the use of fillers such as Aerosil (fumed silica), for example. With these fillers, the cohesion can be increased through filler-polymer interaction. Incorporating the fillers homogeneously is associated with a very high level of technical effort and complexity. If such homogeneous incorporation is not achieved, the benefit of the fillers is absent, since the system will then break up on agglomerates, or the specific surface area is not sufficiently great for polymer chains to be sufficiently adsorbed. Moreover, agglomerates may lead to an inconsistent or rough/streaky coating. In principle, the fillers lead to a reduction in the bond strength.

SUMMARY OF THE INVENTION

The object was to develop PSAs which exhibit very good flagging behaviour virtually independently of the carrier material, such as woven fabric, nonwoven fabric or film carriers. The PSAs are likewise to have a high temperature stability in line with the LV312 standard, preferably of class T4 with figures of 3000 h at 150° C. A high temperature stability on the part of the PSAs may also be apparent from good values in measurement of the Shear Adhesive Failure Temperature (SAFT). At the same time the aim is to develop a PSA which exhibits low and/or controllable unwind force; the cohesive forces are preferably to be controllable for different carriers.

A further object was that the pressure-sensitive adhesives and bonding agents should flow well onto different substrates, such as onto cables as cable cladding, X-PE, ETFE, and also onto convoluted tubes. The intention, moreover, was to develop an adhesive for producing the stated PSAs, exhibiting in particular an increased free volume for effective flow-on.

The objects are achieved by means of an adhesive according to claim 1 and also a pressure-sensitive adhesive according to claim 8, combining the advantages of the adhesive with specific photoinitiators. With the pressure-sensitive adhesive of the invention, it is possible to set the specific profile of requirements in terms of the viscoelastic properties. The objects are further achieved by a process for preparing the pressure-sensitive adhesive, according to claim 12, and also with bonding agents and adhesive tapes according to claims 17 and 21. Preferred embodiments are described in the dependent claims and also in detail in the description.

The invention provides pressure-sensitive adhesives comprising adhesives based on at least one polymerization product of (meth)acrylates, able to form the pressure-sensitive adhesives (PSAs) of the invention by blending with specific photoinitiators and optional UV crosslinking. Having proved to be particularly suitable adhesives are polymerization products of a radical polymerization in solution of acrylates, more particularly polymerization products from an emulsion polymerization or by a similar preparation process known to the skilled person, the molecular weights being adjusted so that Mn is >50 000 g/mol and Mw is >500 000 g/mol.

DETAILED DESCRIPTION

The adhesives of the invention preferably have a high polydispersity and intramollecular voids, in other words a high free volume in the polymer. It is therefore preferred for the adhesive to have a polydispersity Q for the polymer product, where Q=Mw/Mn, of greater than or equal to 5, more particularly greater than or equal to 7, very preferably greater than or equal to 8, 10, 12 or greater than or equal to 14.

Suitable monomers used can be all common esters of acrylates and methacrylates, and also (meth)acrylic acid. The static $T_G$ of the polymerization products of the adhesive ought preferably to be less than 0° C., more preferably less than or equal to −25° C.

In the polymerization for preparing the adhesive, at least one initiator with a high degree of grafting is used, thereby raising the free volume of the polymer and, as a result, increasing the flow-on behaviour. Through this measure it is also possible to lower the residual monomer content, which is preferably less than or equal to 1 wt %, more preferably less than or equal to 0.5 wt %.

A particularly suitable photoinitiator used in the PSA is a polyfunctional, monomeric or oligomeric photoinitiator, preferably a Norrish type I initiator, more preferably an alpha-cleaver, comprising alpha-hydroxy ketones or derivatives thereof, particular preference being given to an oligo [2-hydroxy-2-methyl-1-[4-(1-methylvinyl)phenyl]propanone], or preferably benzophenone derivatives, more particularly polymeric benzophenone derivatives, for example Genopol BP-1 from Rahn, or thioxanthone derivatives, more particularly polymeric thioxanthone derivatives, for example Genopol TX-1 from Rahn.

In order to prepare the PSAs of the invention, the photoinitiator is used, in respect of the overall composition of the PSA, with a concentration of 0.25 wt % to 0.75 wt %, preferably 0.25 to 0.5 wt %.

The invention provides adhesives comprising polymerization products of acrylates, the adhesive being meltable and comprising at least one polymerization product synthesized from a) 75 to 99.9 wt % of esters of (meth)acrylic acid of the general formula I,

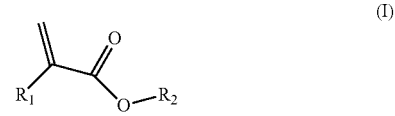

(I)

wherein $R_1$=H or $CH_3$ and $R_2$ is a linear, branched or cyclic alkyl chain having 2 to 20 C atoms, the alkyl chain more particularly having 4 to 14 C atoms, very preferably 4 to 10 C atoms, with preference being given to linear and cyclic alkyl groups with alkyl radicals, b) 0.1 to 25 wt % of (meth)acrylic acid of the formula II,

(II)

where $R_3$=H or $CH_3$,
and the sum of all the components used makes 100 wt % of the polymerization product, the polymerization product having a molecular weight Mn greater than 50 000 g/mol and Mw greater than 500 000 g/mol.

Likewise provided by the invention are adhesives comprising at least one polymerization product obtainable from the reaction of (a) and (b) or synthesized from (a) 75 to 99.9 wt %, more particularly at 80 to 99.9 wt %, preferably 85 to 99.9 wt %, more preferably from 90 or 95 to 99.9 wt %, of at least one ester of (meth)acrylic acid of the general formula I,

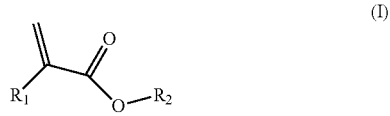
(I)

where $R_1$=H or $CH_3$ and $R_2$ is an alkyl chain having 4 to 20 C atoms, the alkyl chain more particularly having 4 to 14 C atoms, more preferably 4 to 10 C atoms,
b) 0.1 to 20 wt %, more particularly 0.1 to 15 wt %, preferably 0.1 to 10 wt %, more preferably 0.1 to 5 wt %, of at least one (meth)acrylic acid of the formula II, where $R_3$=H or $CH_3$,

(II)

optionally further acrylates and/or methacrylates, such as
c) olefinically unsaturated monomers having functional groups, more particularly of the kind defined below for reactivity with epoxide groups, and which are not already a monomer of the formula II,
d) and/or olefinically unsaturated monomers which in particular are copolymerizable with component (a) and/or (b) the sum of all the components being 100 wt % in the polymerization product. In the adhesive, further to the polymerization product, there may be solvents, solvent mixtures and/or additives and also initiators or catalysts for the polymerization.

Preferred adhesives in accordance with the invention may comprise at least one following polymerization product:
(a) 80 to 99.9 wt % of esters of (meth)acrylic acid of the general formula I,
(b) 0.1 to 20 wt % of (meth)acrylic acid of the formula II
(c) 0 to 10 wt % of olefinically unsaturated monomers having functional groups,
(d) 0 to 10 wt % of olefinically unsaturated monomers, the sum of all of the components used making 100 wt % of the polymerization product.

Preferred adhesives provided are those comprising the polymerization product with a residual monomer content of less than or equal to 1 wt %, more particularly less than or equal to 0.5 wt % in respect of the overall composition.

The combination according to the invention of polymerization products of esters of (meth)acrylic acid, (meth)acrylic acid and also, optionally, further acrylic acid derivatives with the specific photoinitiators allows the preparation of PSAs having the requisite specific viscoelastic profile. This viscoelastic profile is not identical to the degree of crosslinking of EP 1 370 590 B. The viscoelastic profile of the invention, which is needed for a product in order to achieve the objects identified, is characterized very well, with direct reference to the flagging properties of an adhesive tape, by the tesa TFT method.

The adhesive for crosslinking in accordance with the invention and the pressure-sensitive adhesive comprise at least one polyacrylate. This is a polymer which is obtainable by radical polymerization of acrylic monomers, a term which also comprehends methyl acrylic monomers, and optionally further, copolymerizable monomers.

The polymerization product is preferably one which is crosslinkable with epoxide groups. Correspondingly, functional comonomers or monomers crosslinkable with epoxide groups are used with preference as component (c). Employed here more particularly are monomers, preferably (meth)acrylic ester derivatives, having additional functional groups, preferably having acid groups, more particularly carboxylic acid, sulfonic acid or phosphonic acid groups, and/or hydroxyl groups and/or acid anhydride groups and/or epoxide groups and/or amine groups; monomers containing carboxylic acid groups are preferred. It is especially advantageous if the polymerization product is a polyacrylate with copolymerized acrylic acid and/or methacrylic acid, which represent monomers of b).

Further monomers which may be used as comonomers for the polyacrylate are, for example, acrylic and/or methacrylic esters having 21 up to 30 C atoms, vinyl esters of carboxylic acids containing up to 20 C atoms, vinyl aromatics having up to 20 C atoms, ethylenically unsaturated nitriles, vinyl halides, vinyl ethers of alcohols containing 1 to 10 C atoms, aliphatic hydrocarbons having 2 to 8 C atoms and 1 or 2 double bonds, or mixtures of these monomers.

For the process of the invention, preference is given to using a polymerization product deriving from the mixture of reactants hereinafter, comprising, in particular, softening monomers, and also monomers having functional groups capable of entering into reactions—more particularly addition reactions and/or substitution reactions—with the epoxide groups, and also, optionally, further copolymerizable comonomers, especially hardening monomers. The nature of the polyacrylate to be prepared as adhesives (pressure-sensitive; heat-sealing adhesive, viscoelastic non-tacky material and the like) may be influenced in particular by varying the glass transition temperature of the polymerization product through different weight fractions of the individual monomers.

For purely crystalline systems there is a thermal equilibrium between crystal and liquid at the melting point $T_m$. Amorphous or semicrystalline systems, in contrast, are characterized by the transformation of the more or less hard amorphous or semicrystalline phase into a softer (rubber-like to viscous) phase. In the case of polymeric systems in particular, at the glass transition point, there is "thawing" (or "freezing-in" in the case of cooling) of the Brownian molecular motion of relatively long chain segments. The transition from the melting point $T_m$ (also "melting temperature"; actually defined only for purely crystalline systems; "polymer crystals") to the glass transition point $T_g$ (also "glass transition temperature" or "glass temperature") may therefore be considered to be a fluid transition, depending on the fraction of semicrystallinity in the sample under investigation.

For the purposes of this specification, and in line with the observations made above, a statement of the glass transition point also embraces the melting point, and therefore the glass transition point (or else, synonymously, the glass transition temperature) also comprehends the melting point for the corresponding "melting" systems. The reports of the glass transition temperatures are based on the determination by means of DSC.

In order to obtain polymers, for example pressure-sensitive adhesives or heat-sealing compositions, having desired glass transition temperatures, the quantitative composition of the monomer mixture is advantageously selected such as to result, in accordance with an equation (E1) in analogy to the Fox equation (cf. T. G. Fox, *Bull. Am. Phys. Soc.* 1956, 1, 123), in the desired $T_g$ for the polymer.

$$\frac{1}{T_g} = \sum_n \frac{w_n}{T_{g,n}} \quad (E1)$$

Photoinitiator with an amount in respect of the overall composition of the pressure-sensitive adhesive bonding agent that is obtained following removal of a solvent optionally present.

Particularly preferred photoinitiators are selected from a) the α-cleavers composed of oligo[2-hydroxy-2-methyl-1-[4-(1-methylvinyl)phenyl]propanone], 2-hydroxy-1-{4-[4-(2-hydroxy-2-methyl-propionyl)phenoxy]phenyl}-2-methyl-propan-1-one, 2,4,6-trimethylbenzophenone and also mixtures comprising at least two of the aforesaid α-cleavers, and b) benzophenone derivatives, or c) thioxanthone derivatives. A particularly preferred benzophenone derivative is Genopol BP-1 and a preferred thioxanthone derivative is Genopol TX-1.

The radiation crosslinking of the PSA is accomplished with particular preference by means of UV rays, though radiation crosslinking by means of different rays is not excluded. Electron beam crosslinking is also possible, for example. UV irradiation takes place preferably in the wavelength range from 180 to 400 nm.

Also provided by the invention is a bonding means obtainable from the pressure-sensitive adhesive by shaping of the adhesive, more particularly as a bonding means comprising at least one carrier such as, preferably, an adhesive tape, with a TFT (Threshold Flagging Time in [min]) after UV crosslinking of the PSA or after optional electron beam crosslinking (EBC) of preferably greater than or equal to 1000 minutes, more particularly greater than or equal to 1200, more preferably greater than or equal to 1500, very preferably greater than or equal to 2000 minutes, with preference greater than or equal to 2500 minutes. Particularly preferred adhesive tapes have TFTs of greater than or equal to (≥) 4000, ≥4250, ≥4500 or ≥5000 [min]. A key advantage of the adhesives used in accordance with the invention and comprising photoinitiators is evident from the processing window for UV crosslinking, with the possibility of obtaining very good technical adhesive properties with UV doses of 50 to 150 mJ/cm², more particularly of 60 to 120 mJ/cm², and also around 60, 80 or 120 mJ/cm².

By virtue of the UV crosslinking of the polymerization products in the PSAs, the adhesives of the invention exhibit very good Shear Adhesion Failure Temperatures (SAFT). Thus for the PSAs of the invention it is possible to achieve SAFT figures of greater than or equal to 120° C., more particularly greater than or equal to 140° C., preferably greater than or equal to 160° C., more preferably greater than or equal to 170° C. and greater than or equal to 180° C., depending on the concentration of the photoinitiator and on the UV dose in [mJ/min]. The invention accordingly also provides pressure-sensitive adhesives, more particularly bonding agents, having SAFTs of greater than or equal to 140° C., preferably greater than or equal to 150° C.

The possible electron beam crosslinking may take place with suitable electron beam doses or more preferably greater than or equal to 5 kGy to 10 kGy, more particularly 10 to 20, 20 to 30, 30 to 40, or alternatively more preferably from 35 to 45, or else greater than or equal to 40 to a maximum of 50 kGy, advantageously up to 80 kGy, which are sufficient, in particular as EBC dose from the adhesive side, in order, depending on the carrier material used and on the particular PSA, to achieve TFT levels of greater than 1500 minutes, preferably of greater than 2000 minutes, more preferably of greater than or equal to 2100, very preferably greater than or equal to 2200, preferably to achieve TFT levels of greater than or equal to 2500 or even greater than or equal to 3000 and greater than or equal to 4000 minutes.

An advantageous feature of adhesive tapes of the invention is that the TFT (Threshold Flagging Time) after UV crosslinking is greater by comparison with the TFT prior to UV crosslinking, by a factor of around 4 up to greater than or equal to a factor of 10. For this purpose, low UV doses of less than or equal to 80 mJ/cm², more particularly less than or equal to 60 mJ/cm², are preferably sufficient in themselves. At a UV dose of 120 mJ/cm², improvements in the TFT of a factor of greater than or equal to 80, from, for example, a TFT of 62 to 2960 and 5400, are possible, especially if the PSA of the invention has a narrowly defined level of photoinitiator of 0.25 wt % to 0.50 wt % in the overall composition. Surprisingly, and not obviously to the skilled person, it is possible, using photoinitiators (i.e. UV crosslinkers) having at least two photoactive groups per molecule, to obtain PSAs, more particularly bonding agents, which have good flagging properties (measurable through the TFT test) if a balanced ratio is struck between cohesion and adhesion. This is apparent in particular in the rheological properties and specifically in the tan δ (the ratio of G" to G', in other words the ratio of loss modulus to storage modulus), which with particular preference adopts values of between 0.45≤tan δ≤0.50 for a measuring frequency of 0.1 rad/s (corresponding approximately to the timescale of the flagging process) (see Table 6).

The radiation crosslinking, more particularly the UV crosslinking, results in the formation of a wide-meshed crosslinking within the polymer coil, and leads to an increase in the molecular weight in the polymer coils. Advantageously there is virtually no crosslinking between the polymer coils, so that the adhesive remains readily flowable and permits effective wetting of the bond substrate. This phenomenon can be demonstrated by means of rheological investigations (such as DMA, Dynamic Mechanical Analysis).

For good repulsion properties on the part of the PSA, it is advantageous if the PSA has a good energy dissipation capacity. This is manifested advantageously in a favourable loss factor tan δ (ratio between loss modulus G" and storage modulus G'). Here, the storage modulus G' describes the elastic properties, and the loss modulus G" the viscous properties, of a viscoelastic system, as in the present case a pressure-sensitive adhesive, allowing the viscoelasticity of this system to be characterized with a single materials parameter. The values are accessible by way for example of dynamic mechanical analysis (DMA) (see below, "Measurement Methods" section). Data on the loss factor tan δ (and also on the loss modulus G" and the storage modulus G') relate to this measurement, unless otherwise indicated in any specific case.

Very advantageously the loss factor tan δ at 0.1 rad/s and 25° C., stress 2500 Pa is situated in range from 0.45 to 0.50, preferably in the range from 0.46 to 0.49.

Likewise provided by the invention is a process for preparing the pressure-sensitive adhesives, and also pressure-sensitive adhesives obtainable by this process, by mixing (i) an adhesive comprising a polymerization product obtainable in particular from the reaction of the monomers of the formulae I and II and also, optionally, further monomers selected from c) and d), or comprising a polymerization product synthesized from
  (a) 80 to 100 wt % of esters of (meth)acrylic acid of the general formula I,

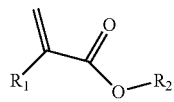
(I)

where $R_1$=H or $CH_3$ and $R_2$ is an alkyl chain having 2 to 20 C atoms, and
  b) 0.1 to 20 wt % of (meth)acrylic acid of the formula II,

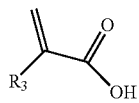
(II)

where $R_3$=H or $CH_3$, and where
the sum total of all components a) and b) used in the polymerization product makes 100 wt %, the adhesive optionally comprising at least one solvent, solvent mixture and/or additives, and the polymerization product having a molecular weight Mn of greater than 50 000 g/mol and Mw of greater than 500 000 g/mol, with
(ii) at least one photoinitiator selected from α-cleavers and benzophenone derivatives; solvents or solvent mixtures optionally present are preferably removed.

After the mixing of the adhesive (i) and photoinitiator (ii) components, solvent optionally present in the adhesive is removed. In the adhesive, besides the polymerization product, there may still be solvent, emulsifying agent or dispersing agent, which is removed after the admixing of the at least one photoinitiator.

The process for preparing the pressure-sensitive adhesive therefore encompasses the following steps:
1) Preparing the adhesive by polymerizing the monomers of the formulae I and II and optionally the monomers selected from (c) and (d), the polymerization preferably taking place radically and more preferably in the presence of solvent or solvent mixtures, very preferably in an emulsion polymerization process; 2) obtaining the adhesive comprising at least one polymerization product and also, optionally, solvents or solvent mixture, emulsifying agents and/or dispersing agents; 3) mixing the resulting adhesive with at least one photoinitiator; and 4) optionally removing a solvent or solvent mixture, and obtaining the pressure-sensitive adhesive.

The photoinitiators used with particular preference in accordance with the invention are preferably selected from oligo[2-hydroxy-2-methyl-1-[4-(1-methylvinyl)phenyl]propanone], 2-hydroxy-1-{4-[4-(2-hydroxy-2-methyl-propionyl)phenoxy]phenyl}-2-methyl-propan-1-one, 2,4,6-trimethylbenzophenone derivatives of the aforementionsed α-cleavers and also mixtures comprising at least two of the aforesaid α-cleavers. Photoinitiators containing sulfur, such as 1-[4-(4-benzoylphenylsulfanyl)phenyl]-2-methyl-2-(4-methylphenylsulfonyl)propan-1-one, are not suitable for preparing the PSAs of the invention.

In order to prepare the PSAs of the invention which in particular have the particular viscoelastic properties, the α-cleaver is used in the PSA with an amount of about 0.25 to 0.75 wt % in respect of the PSA obtainable, more particularly in respect of the substantially solvent-free PSA, in other words essentially in respect of the polymerization product.

Particularly advantageous properties are obtained if the photoinitiator is used at 0.25 to 0.5 wt %, more particularly with a breadth of fluctuation of +/−0.05 wt %, more preferably with a breadth of fluctuation of +/−0.02 wt %.

According to a further embodiment, the invention provides the use of a pressure-sensitive adhesive for producing a bonding agent, a transfer adhesive, an adhesive transfer tape, a coated carrier or an adhesive tape, and also a bonding agent obtainable according to this use, where the meltable pressure-sensitive adhesive is discharged as a melt, more particularly in the temperature range from 60 to 200° C. (hotmelt process), with a coatweight of 20 to 250 g/cm³, more particularly from a die, to give a layer, the layer optionally being applied to a carrier or to a transfer medium, and the layer being crosslinked with high-energy radiation, more particularly with UV radiation.

The UV radiation dose preferably has a radiation energy of between 10 to 150 mJ/cm². Preferred thicknesses of the layer are 2 to 200 μm, the layer being optionally applied to a carrier or to a transfer medium.

The elastic fraction of the pressure-sensitive adhesive, more particularly of the crosslinked pressure-sensitive adhesive, preferably in the form of bonding agent, is in the region of greater than or equal to 30%, more particularly greater than or equal to 40% to 95%, preferably in the range from 40 to 70%.

The pressure-sensitive adhesives of the invention, more particularly the crosslinked pressure-sensitive adhesives, more preferably the bonding agents, have values of well below 600 μm in the microshear test under temperature loading at 40° C., more specifically less than or equal to 500, 400 or 300 μm. In particular, the pressure-sensitive adhesives and bonding agents of the invention also exhibit good TFT values of preferably greater than or equal to 200 min and/or exhibit positive results in the SAFT test above from 100° C. to 200° C.

As carriers for the applied adhesive in the form of a layer it is possible in principle to contemplate all suitable carriers, preference being given to carriers or transfer media that are selected from woven fabric, nonwoven fabric, film, textile and paper. Outer layers and liners are also encompassed as carriers. Particularly preferred are textile carriers, such as a flat textile carrier, preferably a woven fabric, very preferably a woven polyester fabric, a nonwoven fabric or a knitted fabric. The basis weights of the carriers are preferably in the range from 30 to 250 g/m², preferably 50 to 200 g/m², more preferably 60 to 150 g/m².

The production of bonding agents may take place in the form of direct coating or in the form of transfer coating. The bonding agents produced may comprise, as carriers, (1) woven fabric, (2) nonwoven fabric, (3) film, and also assemblies of any combination of the aforementioned carriers (1) to (3), and optionally paper. Furthermore, the bonding agents of the invention may comprise coated carriers, also known as furnished carriers; this furnishing may comprise a barrier layer, a hydrophobic or oleophobic coating, and any combination of the aforesaid coatings.

Bonding agents of the invention, especially flat bonding agents, preferably have a TFT (Threshold Flagging Time) in minutes as follows: greater than or equal to 1000 minutes, more preferably greater than or equal to 1500 minutes, very preferably greater than or equal to 2000 minutes, more preferably greater than or equal to 3000, 3500, 3800, 4000, 4200, 4500 or greater than or equal to 4700, 4800, 4900, 5000, 5100, 5200, 5300, 5400. Preferably these high TFTs can be obtained surprisingly with bonding agents comprising the irradiation-crosslinked PSA based on greater than or equal to 0.25 to 0.5 wt % of at least one photoinitiator in the overall composition.

The bonding agents of the invention are notable preferably for particularly good viscoelastic properties. Hence bonding agents of the invention preferably have tan δ values of between 0.45≤tan δ≤0.50; the tan δ values correspond to the ratio of G" to G', which corresponds to the ratio of loss modulus to storage modulus, measured at a frequency of 0.1 rad/s.

Equally it is preferred for the bonding agents of the invention to have a holding power (HP) of greater than or equal to 100 minutes, more particularly greater than or equal to 110, preferably greater than or equal to 120, 130, 140, 150, 160 or 170. These holding powers are preferably measured in accordance with the HP method. The holding power is measured on a strip of the bonding agent with carrier, more particularly an adhesive tape, that is 13 mm wide and at least 20 mm long (30 mm long, for example), on a smooth steel surface, with a bond area of 20 mm×13 mm (length×width), with the bonding agent overhanging the test plate at the edge, after the bonding agent has been pressed on four times with an applied pressure corresponding to a weight of 2 kg on the steel support, to form the sample; measurement takes place by a) suspending the sample vertically, so that the protruding end of the adhesive tape points downwards, b) fastening a weight of 1 kg to the protruding end of the bonding agent at room temperature, with measurement under standard conditions (23° C., 55% humidity) and optionally at 70° C., c) measuring the holding power in minutes as the time taken for the adhesive tape to undergo full detachment from the substrate.

Particularly preferred bonding agents according to the invention have holding powers of greater than or equal to 100 and at the same time TFTs of greater than or equal to 2000, more particularly greater than or equal to 2500.

According to one embodiment of the invention, flat bonding agents are provided that are selected from a label, diecut, adhesive tape, cable wrapping tape or a protective film or a flat transfer adhesive or an adhesive transfer tape.

Likewise claimed are flat bonding agents, more particularly adhesive tapes, for enveloping elongate material, such as cable harnesses in particular, and the use for enveloping, such as cable wrapping tapes, more particularly for wrapping cables, comprising a carrier, preferably a textile carrier.

Preference is given to using a polymerization product which can be traced back to the following monomer composition:

Monomers for preparing the polymerization products; the monomers of component (a) esters of acrylic acid of the formula I, are more particularly softening and/or non-polar monomers. For the monomers (a), preference is given to using acrylic monomers which comprise acrylic and methacrylic esters with alkyl groups consisting of 2 to 20 C atoms, preferably 2 to 9 C atoms. Examples of such monomers are n-butyl acrylate, n-butyl methacrylate, n-pentyl acrylate, n-pentyl methacrylate, n-amyl acrylate, n-hexyl acrylate, hexyl methacrylate, n-heptyl acrylate, n-octyl acrylate, n-octyl methacrylate, n-nonyl acrylate, isobutyl acrylate, isooctyl acrylate, isooctyl methacrylate, and their branched isomers, such as sec-butyl acrylate, tert-butyl acrylate, particularly preference being given to n-butyl acrylate, n-butyl methacrylate, 2-ethylhexyl acrylate, 2-ethylhexyl methacrylate.

The monomers of component b) are, in particular, acrylic acid and methacrylic acid.

The monomers of component (c) are, in particular, olefinically unsaturated monomers having functional groups, more particularly having functional groups which are able to enter into a reaction with the epoxide groups. Preferred monomers are functionalized (meth)acrylates, more particularly having at least one further functional group selected from hydroxyl, carboxylic acid, anhydride, amide, urethane, sulfonic acid and phosphoric acid groups.

Preferred for use for component (c) are monomers with functional groups selected from the following listing: hydroxyl, carboxyl, sulfonic acid or phosphonic acid groups, acid anhydrides, epoxides, amines.

Particularly preferred examples of monomers of component (c) are itaconic acid, maleic acid, fumaric acid, crotonic acid, aconitic acid, dimethylacrylic acid, β-acryloyloxypropionic acid, trichloroacrylic acid, vinylacetic acid, vinylphosphonic acid, maleic anhydride, hydroxyethyl acrylate, hydroxypropyl acrylate, hydroxyethyl methacrylate, hydroxypropyl methacrylate, 6-hydroxyhexyl methacrylate, allyl alcohol, glycidyl acrylate and glycidyl methacrylate.

In principle for component (c) it is possible to use all vinylically functionalized compounds which are copolymerizable with component (a) and/or with component (b), and which may also serve to adjust the properties of the resultant PSA.

Monomers stated by way of example for component (d) are as follows:

Alkyl esters of acrylic acid having 1 to 3 C atoms and/or 21, 22, 23, 24 to 30 C atoms in the ester group and also aryl esters, and also further esters, different from the (a) esters of (meth)acrylic acid of the general formula I; also considered olefinically unsaturated monomers are esters of acrylic acid with ether groups; more particularly methyl acrylate, ethyl acrylate, propyl acrylate, methyl methacrylate, ethyl methacrylate, benzyl acrylate, benzyl methacrylate, phenyl acrylate, phenyl methacrylate, isobornyl acrylate, isobornyl methacrylate, tert-butylphenyl acrylate, tert-butylphenyl methacrylate, dodecyl methacrylate, isodecyl acrylate, lauryl acrylate, n-undecyl acrylate, stearyl acrylate, tridecyl acrylate, behenyl acrylate, cyclohexyl methacrylate, cyclopentyl methacrylate, phenoxyethyl acrylate, phenoxyethyl methacrylate, 2-butoxyethyl methacrylate, 2-butoxyethyl acrylate, 3,3,5-trimethylcyclohexyl acrylate, 3,5-dimethyladamantyl acrylate, 4-cumylphenyl methacrylate, cyanoethyl acrylate, cyanoethyl methacrylate, 4-biphenylyl acrylate, 4-biphenylyl methacrylate, 2-naphthyl acrylate, 2-naphthyl methacrylate, tetrahydrofurfuryl acrylate, diethylaminoethyl acrylate, diethylaminoethyl methacrylate, dimethylaminoethyl acrylate, dimethylaminoethyl methacrylate, 2-butoxyethyl acrylate, 2-butoxyethyl methacrylate, methyl 3-methoxyacrylate, 3-methoxybutyl acrylate, 2-phenoxyethyl methacrylate, butyl diglycol methacrylate, ethyleneglycol acrylate, ethyleneglycol monomethylacrylate, methoxy-polyethylene glycol methacrylate 350, methoxy-polyethylene glycol methacrylate 500, propylene glycol monomethacrylate, butoxydiethylene glycol methacrylate, ethoxytriethylene glycol methacrylate, octafluoropentyl acrylate, octafluoropentyl methacrylate, 2,2,2-trifluoroethyl methacrylate, 1,1,1,3,3,3-hexafluoroisopropyl acrylate, 1,1,1,3,3,3-hexafluoroisopropyl methacrylate, 2,2,3,3,3-pentafluoropropyl methacrylate, 2,2,3,4,4,4-hexafluorobutyl methacrylate, 2,2,3,3,4,4,4-heptafluorobutyl acrylate, 2,2,3,3,4,4,4-heptafluorobutyl methacrylate, 2,2,3,3,4,4,5,5,6,6,7,7,8,8,8-pentadecafluorooctyl methacrylate, dimethylaminopropylacrylamide, dimethylaminopropylmethacrylamide, N-(1-methylundecyl)acrylamide, N-(n-butoxymethyl)acrylamide, N-(butoxymethyl)methacrylamide, N-(ethoxymethyl)acrylamide, N-(n-octadecyl)acrylamide, and also N,N-dialkyl-substituted amides, such as, for example, N,N-dimethylacrylamide, N,N-dimethylmethacrylamide, N-benzylacrylamides, N-isopropylacrylamide, N-tert-butylacrylamide, N-tert-octylacrylamide, N-methylolacrylamide, N-methylolmethacrylamide, acrylonitrile, methacryolnitrile, vinyl ethers, such as vinyl methyl ether, ethyl vinyl ether and vinyl isobutyl ether, vinyl esters, such as vinyl acetate, vinyl chloride, vinyl halides, vinylidene chloride, vinylidene halides, vinylpyridine, 4-vinylpyridine, N-vinylphthalimide, N-vinyllactam, N-vinylpyrrolidone, styrene, α- and p-methylstyrene, α-butylstyrene, 4-n-butylstyrene, 4-n-decylstyrene, 3,4-dimethoxystyrene, macromonomers such as 2-polystyrene-ethyl methacrylate (molecular weight Mw from 4000 to 13000 g/mol), poly(methyl methacrylate)-ethyl methacrylate (Mw from 2000 to 8000 g/mol).

Monomers of component (d) may advantageously also be selected to include functional groups which assist subsequent radiation crosslinking (by electron beams or UV, for example). Suitable copolymerization photoinitiators are, for example, benzoin acrylate and acrylate-functionalized benzophenone derivatives. Monomers which support crosslinking by electron bombardment are, for example, tetrahydrofurfuryl acrylate, N-tert-butylacrylamide, allyl acrylate—this enumeration is not conclusive.

The preparation of the polyacrylates may take place according to the processes familiar to the skilled person, especially advantageously by conventional radical polymerizations or controlled radical polymerizations. The polyacrylates may be prepared by copolymerization of the monomeric components, with use of the customary polymerization initiators and also, optionally, of chain transfer agents, polymerization taking place at the customary temperatures in bulk, in emulsion, for example in water or liquid hydrocarbons, or in solution.

The polyacrylates are prepared preferably by polymerization of the monomers in solvents, more particularly in solvents with a boiling range of 50 to 150° C., preferably of 60 to 120° C., with use of the customary amounts of polymerization initiators, generally at 0.01 to 5, more particularly at 0.1 to 2 wt % (based on the total weight of the monomers).

Suitable in principle are all customary initiators for acrylates that are familiar to the skilled person. Examples of radical sources are peroxides, hydroperoxides and azocompounds, for example dibenzoyl peroxide, cumene hydroperoxide, cyclohexanone peroxide, di-tert-butyl peroxide, cyclohexylsulfonyl acetyl peroxide, diisopropyl percarbonate, tert-butyl peroctoate and benzopinacol. One very preferred procedure uses as its radical initiator 2,2'-azobis(2-methylbutyronitrile) (Vazo® 67™ from DuPont) or 2,2'-azobis(2-methylpropionitrile) (2,2'-azobisisobutyronitrile; AIBN; Vazo® 64™ from DuPont).

Suitable solvents include alcohols, such as methanol, ethanol, n- and isopropanol, n- and isobutanol, preferably isopropanol and/or isobutanol, and also hydrocarbons such as toluene and, in particular, benzines with a boiling range from 60 to 120° C. More particularly it is possible to use ketones, such as preferably acetone, methyl ethyl ketone, methyl isobutyl ketone, and esters, such as ethyl acetate, and also mixtures of solvents of the type stated, with preference being given to mixtures comprising isopropanol, particularly in amounts of 2 to 15 wt %, preferably 3 to 10 wt %, based on the solvent mixture employed.

The numerical average of the molar mass, Mn, of the polymerization products of the acrylates is preferably greater than or equal to 50 000 g/mol, more preferably at levels specified above. The weight average molecular weight, $M_w$ of the polyacrylates is preferably in a range from 500 000 to 2 000 000 g/mol; very preferably in a range from 500 000 to 1 500 000 g/mol, more preferably in a range from 1 000 000 to 1 500 000 g/mol, alternatively from 500 000 to 1 000 000 g/mol [the figures for the average molecular weight $M_w$ and the polydispersity (PD), represented as Q, in this specification pertain to the determination by gel permeation chromatography (see measurement method A2; Experimental section)]. For this purpose it may be advantageous to carry out the polymerization in the presence of suitable chain transfer agents such as thiols, halogen compounds and/or alcohols in order to set the desired average molecular weight.

The polyacrylate preferably has a K value of 30 to 90, more preferably of 40 to 70, as measured in toluene (1% strength solution, 21° C.). The K value according to Fikentscher is a measure of the molecular weight and of the viscosity of the polymer.

Prior to the thermal crosslinking, the polyacrylates obtainable by the process of the invention may be admixed with at least one tackifying resin. Tackifying resins to be added that can be used are those tackifier resins that are already known and described in the literature. Reference may be made more particularly to all aliphatic, aromatic and alkylaromatic hydrocarbon resins, hydrocarbon resins based on pure monomers, hydrogenated hydrocarbon resins, functional hydrocarbon resins and also natural resins. It is possible with preference to employ pinene resins, indene resins and rosins, their disproportionate, hydrogenated, polymerized, esterified derivatives and salts, terpene resins and terpene-phenolic resins, and also $C_5$, $C_9$ and other hydrocarbon resins. Combinations of these and further resins may also be employed advantageously in order to bring the properties of the resultant adhesive into line with requirements. With particular reference it is possible to employ all (soluble) resins that are compatible with the corresponding polyacrylate. One particularly preferred procedure adds terpene-phenolic resins and/or rosin esters.

Optionally it is also possible for powderous and granular fillers, dyes and pigments, including, in particular, abrasive and reinforcing examples such as chalks, ($CaCO_3$), titanium dioxides, zinc oxides and carbon blacks, to be metered outstandingly into the polyacrylate melt, even in high proportions, in other words from 1 to 50 wt %, based on the overall formula, and to be incorporated homogeneously and applied as a coating on a two-roll applicator mechanism. It is here that the conventional processes often fail, owing to the very high viscosity then present in the overall compounded formulation.

Very preferably it is possible to use different forms of chalk as filler, particular preference being given to the use of Mikrosohl chalk. At preferred proportions of up to 30 wt %, the addition of filler produces virtually no change in the technical adhesive properties (shear strength at RT, instantaneous bond strength to steel and PE).

Furthermore, it is possible for low-flammability fillers such as, for example, ammonium polyphosphate, and also electrically conductive fillers (such as conductive carbon black, carbon fibres and/or silver-coated beads, for example), and also thermally conductive materials (such as boron nitride, aluminium oxide and silicon carbide, for example), and also ferromagnetic additives (such as iron(III) oxides, for example), and also additives for increasing volume, especially for the production of foamed layers and/or syntactic foams (such as, for example, blowing agents, solid glass beads, hollow glass beads, carbonized microspheres, phenolic hollow microspheres, microspheres made from other materials, expandable microballoons (Expander® from AkzoNobel), silica, silicates, renewable organic raw materials, examples being sawdust, organic and/or inorganic nanoparticles, fibres), and also ageing inhibitors, light stabilizers, ozone protectants, compounding agents and/or expandants, to be added or compounded in before or after the concentration of the polyacrylate. Ageing inhibitors which can be used are preferably not only primary inhibitors, as for example 4-methoxyphenol or Irganox® 1076, but also secondary ageing inhibitors, as for example Irgafos® TNPP or Irgafos® 168 from BASF, and they can also be used in combination with one another. Reference here will be made only at this point to further, corresponding Irganox® products from BASF and/or Hostanox® products from Clariant. Other outstanding agents to counter ageing that may be used include phenothiazine (C-radical scavenger) and also hydroquinone monomethyl ether in the presence of oxygen, and also oxygen itself.

The customary plasticizers (plasticizing agents) may optionally be added, more particularly in concentrations of up to 5 wt %. Plasticizers which can be metered in include, for example, low molecular mass polyacrylates, phthalates, water-soluble plasticizers, plasticizer resins, phosphates, polyphosphates, adipates and/or citrates.

Furthermore, optionally, the thermally crosslinkable acrylate hotmelt may also be blended with other polymers. Suitable for this purpose are polymers based on natural rubber, synthetic rubber, styrene block copolymers, EVA, silicone rubber, acrylic rubber, and polyvinyl ethers. It proves useful here to add these polymers in granulated or otherwise comminuted form to the acrylate hotmelt before the thermal crosslinker is added. The polymer blends are produced in an extruder, preferably in a multiple-screw extruder, or in a planetary roller mixer. In order to stabilize the thermally crosslinked acrylate hotmelts, especially, as well, polymer blends of thermally crosslinked acrylate hotmelts and other polymers, it may be sensible to irradiate the shaped material with low-dose electron beams. For this purpose it is optionally possible to add crosslinking promoters to the polyacrylate, such as di-, tri- or polyfunctional acrylate, polyester and/or urethane acrylate.

Generally as photoinitiators it is possible with preference to use those which either break down homolytically into two radical fragments (α-cleavers such as benzoin derivatives, for example) or, by excitation to the triplet state, form diradicals (for example, benzophenone derivatives), which generate reactive radicals by hydrogen abstraction in the polymer, e.g.:

α-hydroxy ketones, benzophenone derivatives, phenylglyoxylates, benzil dimethyl ketals; such as 1-hydroxycyclohexyl phenyl ketone, mixture of benzophenone/1-hydroxycyclohexyl phenyl ketone, 2-hydroxy-2-methyl-1-phenyl-1-propanone; 2-hydroxy-1-[4-(2-hydroxyethoxyl)phenyl]-2-methyl-1-propanone, methyl benzoylformate, oxyphenylacetic acid 2-[2-oxo-2-phenylacetoxyethoxy] ethyl ester and oxyphenylacetic acid 2-[2-hydroxyethoxy] ethyl ester, alpha,alpha-dimethoxy-alpha-phenylacetophenone, 2-benzyl-2-(dimethylamino)-1-[4-(4-morpholinyl) phenyl]-1-butanone, 2-methyl-1-[4-(methylthio)phenyl]-2-(4-morpholinyl)-1-propanone, diphenyl(2,4,6-trimethylbenzoyl)phosphine oxide.

Even more preferred are photoinitiators having at least two of the photoactive groups per molecule, in which case these groups may be two photoreactive groups of the same kind or else two different photoreactive groups.

Preferred examples are as follows: Esacure KIP 150, Esacure 1001 M and also mixtures of the above-stated systems with monofunctional photoinitiators.

BRIEF DESCRIPTION OF THE DRAWINGS

The adhesive tape will now be more particularly elucidated using several figures without any intention thereby to cause any kind of restriction.

In the figures

FIG. 1 shows a section in the transverse direction (cross section) of the adhesive tape, which consists of a woven fabric carrier 1 applied on one side of which is a layer of a self-adhesive coating 2.

FIG. 2 shows a detail of a cable harness which is composed of a bundling of individual cables 7 and which is jacketed with the adhesive tape 11 of the invention. The adhesive tape is guided in a helical-linear movement around the cable harness.

The cable harness detail shown shows two windings I and II of the adhesive tape. Further windings would extend towards the left; they are not depicted here.

Figure 1:
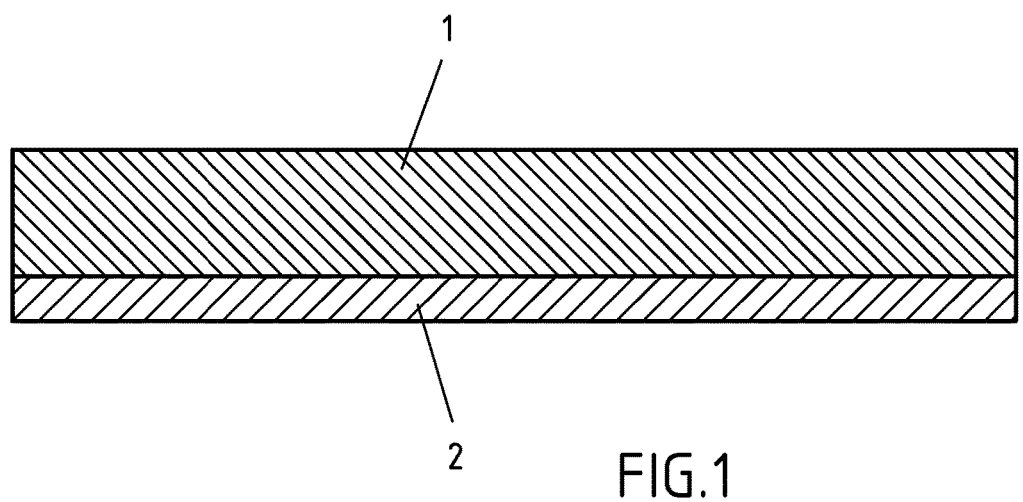
FIG. 1 shows the adhesive tape in lateral section.
Figure 2:
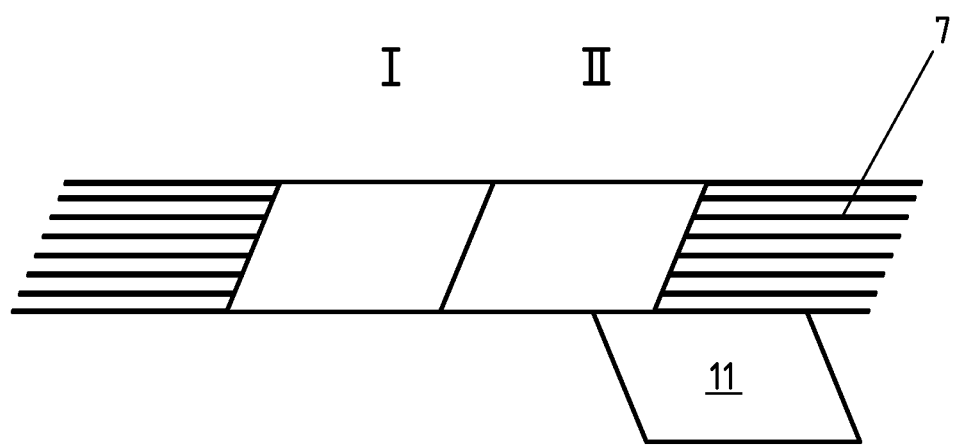
FIG. 2 shows a detail of a cable harness composed of a bundling of individual cables and jacketed with the adhesive tape of the invention.
Figure 3:
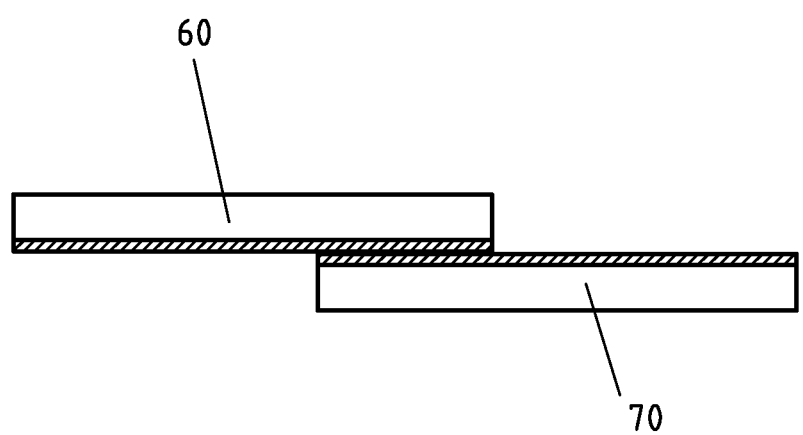
FIG. 3 shows an advantageous use of the adhesive tape.

In a further embodiment for jacketing, two tapes of the invention, 60 and 70, furnished with an adhesive, are laminated onto one another with their adhesives offset (preferably by 50% in each case), to produce a product as depicted in FIG. 3.

EXPERIMENTAL SECTION

The exemplary experiments below are intended to elucidate the invention in more detail, without any intention that the invention should be unnecessarily restricted through the choice of examples given.

Measurement Methods (General):

Static Glass Transition Temperature Tg:

The static glass transition temperature is determined via dynamic scanning calorimetry in accordance with DIN 53765. The figures for the glass transition temperature Tg relate to the glass transformation temperature value Tg according to DIN 53765:1994-03, unless specifically indicated otherwise.

Dynamic mechanical analysis (DMA) for the determination of loss factor tan δ procedure: loss factor values (and also loss modulus values and storage modulus values) are determined by means of frequency sweep. All data for the purposes of this specification relate to the results of these measurements, unless specifically indicated otherwise. In DMA, use is made of the fact that the properties of viscoelastic materials subject to a sinusoidal mechanical stress are dependent on the frequency of the stress (in other words on the time) and on the temperature.

DMA procedure: instrument: Rheometric Scientific RDA III; measuring head: spring-mounted with standard force; heating: heating chamber; measurement geometry: parallel plate arrangement, sample thickness 1 (±0.1) mm; sample diameter 25 mm (to produce a sample 1 mm thick, five layers (each 200 µm) of the adhesive tape under investigation were laminated to one another; since the PET carrier does not make any critical contribution to the rheological properties, its presence can be disregarded).

In DMA, use is made of the fact that the properties of viscoelastic materials subject to a sinusoidal mechanical stress are dependent on the frequency of the stress (in other words on the time) and on the temperature. In the case of the TTS method, frequency measurements conducted at regular temperature intervals are calculated to give a frequency sweep; by this means, the range accessible through the measurements can be expanded by a number of decades downwards and upwards.

All DMA procedures: measuring instrument: Rheometric Scientific RDA III; measuring head: spring-mounted with standard force; heating: heating chamber; measurement geometry: parallel plate arrangement, sample thickness 1 (±0.1) mm; sample diameter 25 mm (to produce a sample 1 mm thick, five layers (each 200 µm) of the adhesive tape under investigation were laminated to one another; since the PET carrier does not make any critical contribution to the rheological properties, its presence can be disregarded).
Method tan δ (0.1 rad/s), 25° C. by means of DMA SAFT—Shear Adhesive Failure Temperature:

This test is used for accelerated testing of the shear strength of adhesive tapes under temperature load. For the test, the adhesive tape under investigation is adhered to a heatable steel plate and loaded with a weight (50 g), and the shear travel is recorded.

Sample Preparation:

The adhesive tape under investigation is adhered to an aluminium foil 50 µm thick. The adhesive tape thus prepared is cut to a size of 10 mm×50 mm. The cut-to-size adhesive tape sample is bonded to a polished steel test plate cleaned with acetone (steel material 1.4301, DIN EN 10088-2, surface 2R, surface roughness Ra=30 to 60 nm, dimensions 50 mm×13 mm×1.5 mm) in such a way that the bond area of the sample is 13 mm×10 mm—height×width—and the steel test plate protrudes by 2 mm at the upper edge. The bond is then fixed by rolling a 2 kg steel roller over it six times at a speed of 10 m/min. At the top the sample is reinforced flush with a stable adhesive strip which serves as a support for the travel sensor. Using the steel plate, the sample is then suspended such that the adhesive tape end with the longer overhang points vertically downwards.

Measurement:

The sample for measurement is loaded at the bottom end with a 50 g weight. The steel test plate with the bonded sample is heated to the end temperature of 200° C., beginning at 25° C. and at a rate of 9° C. per minute. The slip travel of the sample is observed by means of a travel sensor, as a function of temperature and time. The maximum slip travel is set at 1000 µm (1 mm); if exceeded, the test is discontinued. Test conditions: room temperature 23±3° C., relative humidity 50±5%. The test is considered passed (the sample sufficiently temperature-resistant) if at 200° C. the slip travel has not exceeded the figure of 1000 µm. If the test is failed, the temperature at the point of attainment of the maximum slip travel (1000 µm) is reported (in ° C.).

TFT Method (Measurement Method H4)

Assessment Criteria:

The present criteria for an application-compatible adhesive tape for the wrapping of cables are the bond strength to steel, the bond strength to the reverse face in combination with the unwind force at 30 m/min. Unwind force of rolls after storage at room temperature, around 23° C. over four weeks at 50% humidity.

Test Procedure: unless expressly stated otherwise, the measurements are conducted under test conditions of 23±1° C. and 50±5% relative humidity.

Figure 4:
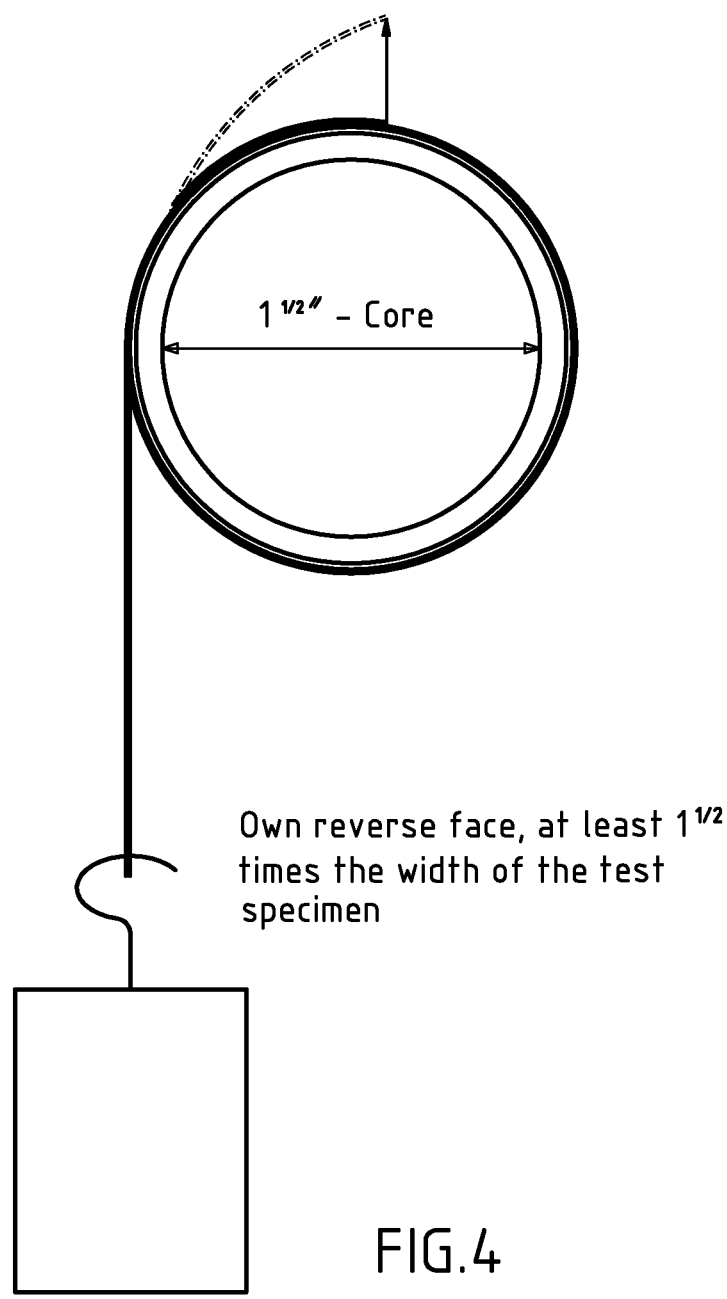
FIG. 4 illustrates the TFT method for measurement of flagging resistance.

Measurement of the flagging resistance to LV312, or TFT method (Threshold Flagging Time): for the determination of the flagging behaviour by the TFT method, a test is employed in which an additional flexural stress is generated by the application of the test specimens, prepared in a flat format, to a 1½" core. The combination of tensile load by a test weight and flexural stress causes flagging-like detachment of the adhesive tape starting from the bonded upper end, and ultimate failure by dropping of the test specimens (see FIG. 4, which also shows the schematic construction). The time in minutes before dropping is the result. The critical parameters for the holding time of the test specimens are weight and temperature, the weight being selected such as to result in values of at least 100 minutes.

The cylindrically shaped test mandrel is a 1½" card core with an external diameter of 42±2 mm, provided with a marking line 5 mm adjacent to the vertex line. The adhesion base is the adhesive tape's own reverse face. The manual roller has a weight of 2 kg. The test weight is 1 kg. The test conditions are 23±1° C. and 50±5% relative humidity, or 40° C. in a heating cabinet.

Figure 5:
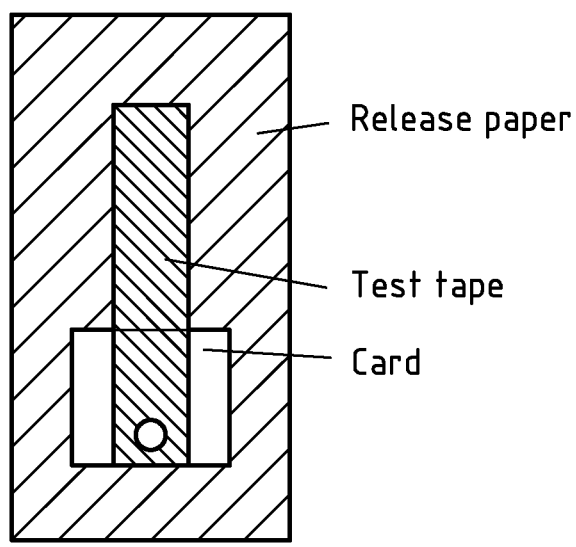
FIG. 5 illustrates a test strip assembly for use in the flagging resistance test.
Figure 6:
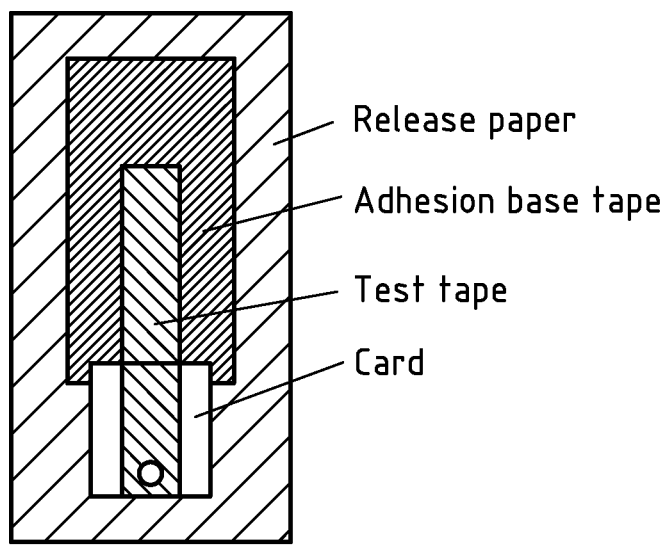
FIG. 6 illustrates a test strip bonded to an adhesion base.
Figure 7:
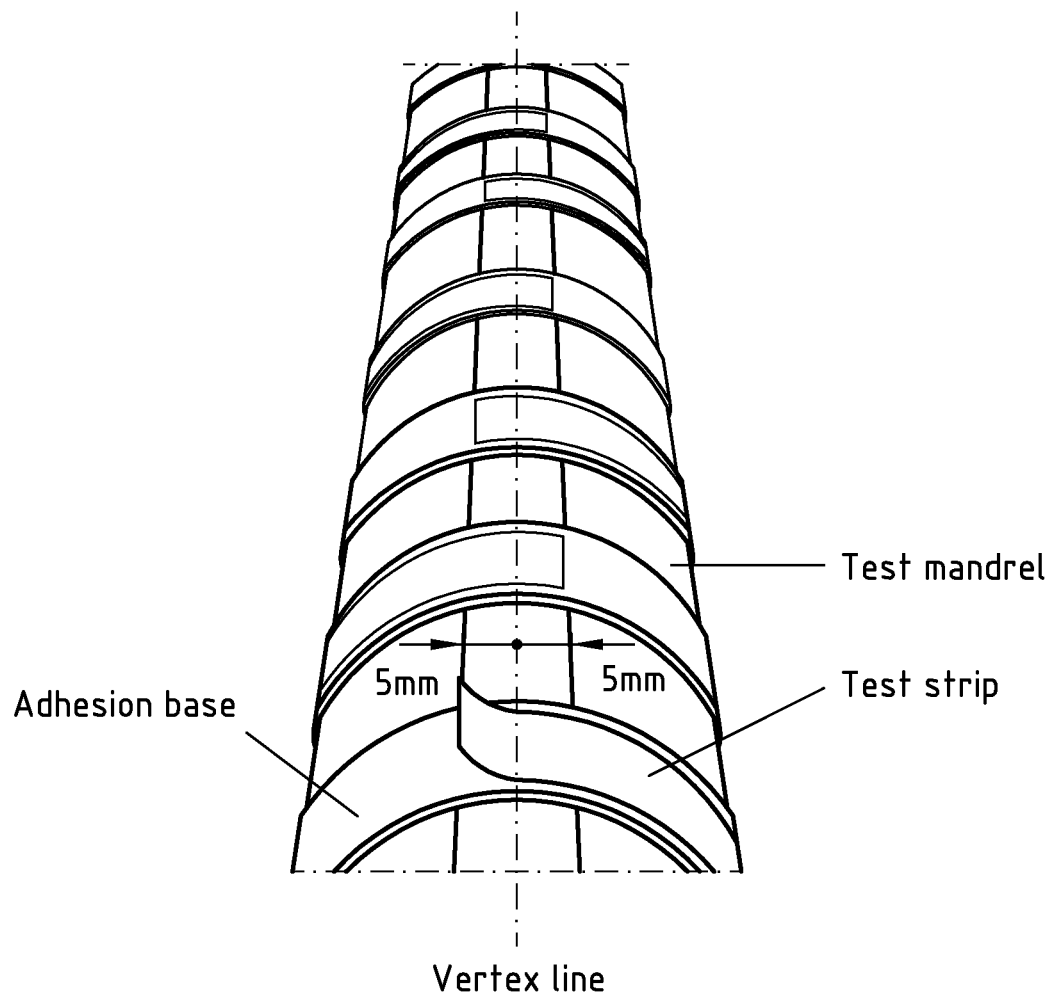
FIG. 7 illustrates test samples adhered to a card core.

Testing takes place on strips of adhesive tapes 19 mm wide. A strip with a length of 400 mm is adhered to release paper and cut to form three strips each 100 mm in length. This should be done using a fresh cutter blade. The reverse face must not be touched. A small piece of card is adhered beneath one of the ends of each strip, and the assembly is perforated (see FIG. 5). The test strips are then individually bonded centrally to strips of the broader adhesion base (adhesive tape with a width 1½ times that of the adhesive tape under test), so that the small piece of card still overlaps just (2 to 3 mm) at the end (see FIG. 6). The test specimens are rolled down using the 2 kg manual roller at a speed of 10 m/min in three cycles. The finished test samples, in other words the test strips together with adhesion base, are then adhered to the card core in such a way that the upper end of the test specimen overlaps the vertex point by 5 mm (see FIG. 7). In this operation, only the adhesion base, and not the test specimen, must be pressed on. The fully prepared test specimens are left for 20±4 hours without weight loading in a controlled-climate chamber at 40° C.

Weights with a mass of one kilogram are then hung onto the specimens, and the stopwatch is started. The measurement ends after failure of all three test specimens of one sample. The median of the three individual measurements is reported in minutes.

The holding time is reported in minutes. In this context, a TFT of >1000 minutes, preferably greater than 1200 minutes, more preferably greater than 2000 minutes is considered to be a lower limit with regard to resistance towards flagging.

Unwind force; measurement of the unwind force to LV312 at a take-off speed of 30 m/min.

K Value (According to Fikentscher) (Measurement Method A1):

The K value is a measure of the average size of molecule in high-polymer materials. For the measurement, one percent strength (1 g/100 mL) toluenic polymer solutions were prepared and their kinematic viscosities were determined using a VOGEL-OSSAG viscometer. Standardization to the viscosity of toluene produces the relative viscosity, from which the K value can be calculated by the method of Fikentscher (*Polymer* 1967, 8, 381 ff.)

Gel Permeation Chromatography GPC (Measurement Method A2):

The figures for the number-average molar mass Mn, the weight-average molecular weight $M_w$ and the polydispersity PD in this specification relate to the determination by gel permeation chromatography. The determination is made on a 100 μL sample which has undergone clarifying filtration (sample concentration 4 g/L). The eluant used is tetrahydrofuran with 0.1 vol % trifluoroacetic acid. Measurement takes place at 25° C. The pre-column used is a PSS-SDV column, 5μ, $10^3$ Å, ID 8.0 mm×50 mm. Separation takes place using the columns PSS-SDV, 5μ, $10^3$ Å and also $10^5$ Å and $10^6$ Å, each of ID 8.0 mm×300 mm (columns from Polymer Standards Service; detection by differential refractometer—Shodex RI71). The flowrate is 1.0 mL per minute. Calibration takes place against PMMA standards (polymethyl methacrylate calibration).

HP—Holding Power (Measurement Method H2):

A strip of the adhesive tape 13 mm wide and more than 20 mm long (30 mm for example) was applied to a smooth steel surface which had been cleaned three times with acetone and once with isopropanol. The bond area was 20 mm×13 mm (length×width), with the adhesive tape overhanging the test plate at the edge (for example by 10 mm, corresponding to the 30 mm length indicated above). The adhesive tape was then pressed four times onto the steel support, with an applied pressure corresponding to a weight of 2 kg. This sample was hung vertically, so that the protruding end of the adhesive tape points downwards.

At room temperature, a 1 kg weight was fastened to the protruding end of the adhesive tape. The measurement is carried out under standard conditions (23° C., 50±5% humidity) and 70° C. in a thermal cabinet.

The holding powers measured (times taken for the adhesive tape to detach completely from the substrate; measurement discontinued at 10 000 min) are reported in minutes and correspond to the average value from three measurements.

MST—Microshear Test (Measurement Method H3)

This test is used for the accelerated testing of the shear strength of adhesive tapes under temperature load.

Sample Preparation for Microshear Test:

An adhesive tape (length about 50 mm, width 10 mm) cut from the respective sample specimen is adhered to a steel test plate which has been cleaned with acetone, in such a way that the steel plate protrudes beyond the adhesive tape to the right and to the left, and that the adhesive tape protrudes beyond the test plate by 2 mm at the upper edge. The bond area of the sample in terms of height×width=13 mm×10 mm. The bond site is subsequently rolled down six times with a 2 kg steel roller at a speed of 10 m/min. The adhesive tape is reinforced flush with a stable adhesive strip which serves as a support for the travel sensor. The sample is suspended vertically by means of the test plate.

Microshear Test:

The sample specimen for measurement is loaded at the bottom end with a 100 g weight. The test temperature is 40° C., the test duration is 30 minutes (15 minutes of loading and 15 minutes of unloading). The shear travel after the predetermined test duration at constant temperature is reported as a result, in μm, as both the maximum value ["max"; maximum shear travel as a result of 15-minute loading]; and as the minimum value ["min"; shear travel ("residual deflection") 15 minutes after unloading; on unloading there is a movement back as a result of relaxation]. Likewise reported is the elastic component in percent ["elast"; elastic component=(max−min)×·100/max].

PSA Examples: Preparation of the Starting Polymers for Examples IE1 to IE8

The preparation of the starting polymers is described below. The polymers investigated are prepared conventionally via a free radical polymerization in solution.

Base Polymer P1:

A reactor conventional for radical polymerizations was charged with 30 kg of 2-ethylhexyl acrylate, 67 kg of n-butyl acrylate, 3 kg of acrylic acid and 66 kg of acetone/isopropanol (96:4). After nitrogen gas has been passed through the reactor for 45 minutes, with stirring, the reactor was heated to 58° C. and 50 g of 2,2'-azobis(2-methylbutyronitrile) were added. The external heating bath was then heated to 75° C. and the reaction was carried out constantly at this external temperature. After one hour a further 50 g of 2,2'-azobis(2-methylbutyronitrile) were added, and after four hours the batch was diluted with 20 kg of acetone/isopropanol mixture (96:4).

After five hours and again after seven hours, re-initiation took place with 150 g of bis-(4-tert-butylcyclohexyl) peroxydicarbonate each time, and the batch was diluted with 23 kg of acetone/isopropanol mixture (96:4). After a reaction time of 22 hours, the polymerization was discontinued and cooling took place to room temperature. The polyacrylate has a conversion of 99.6%, a K variable of 75.1, an average molecular weight of $M_w$=1 480 000 g/mol and a polydispersity (PD) $Q=(M_w/M_n)$=16.1.

Base Polymer P2:

In analogy to example P1, 68 kg of 2-ethylhexylacrylate, 25 kg of methyl acrylate and 7 kg of acrylic acid were polymerized in 66 kg of acetone/isopropanol (94:6). Initiation took place twice with 50 g of 2,2'-azobis(2-methylbutyronitrile) each time, and twice with 150 g of bis-(4-tert-butylcyclohexyl) peroxydicarbonate each time, and dilution took place with 20 kg of acetone/isopropanol mixture (94:6). After a reaction time of 22 hours, the polymerization was discontinued and cooling took place to room temperature.

The polyacrylate has a conversion of 99.7%, a K value of 51.3, an average molecular weight of $M_w$=676 000 g/mol, and a polydispersity (PD) $Q=(M_w/M_n)$=9.5.

Comparative examples (CE) and inventive examples (IE) 1 to 60: the inventive and comparative examples below all feature a coatweight of 50 g/m² on an etched PET film 23 μm thick.

TABLE 1a

Adhesive data for base polymer P1 with UV crosslinker Esacure KIP 150 (oligo[2-hydroxy-2-methyl-1-[4-(1-methylvinyl)phenyl]propanone], CAS no. 163702-01-0)

| Example | Crosslinker | Concentration [wt %] | Dose [mJ/cm²] | HP RT [min] | Fract. | MST max. [µm] | Elast. comp. [%] | SAFT [° C.] | SAFT [µm] | TFT [min] |
|---|---|---|---|---|---|---|---|---|---|---|
| CE1 | Esacure | 0.10 | 60 | <10 | C | 890 | 23 | <100 | — | 180 |
| CE2 | KIP 150 | | 80 | <10 | C | 800 | 33 | <100 | — | 260 |
| CE3 | | | 120 | <10 | C | 740 | 38 | <100 | — | 62 |
| IE4 | | 0.25 | 60 | 16 | C | 406 | 50 | 123 | — | 1260 |
| IE5 | | | 80 | 42 | M | 294 | 57 | 148 | — | 2800 |
| IE6 | | | 120 | 177 | A | 228 | 66 | 173 | — | 2960 |
| IE7 | | 0.50 | 60 | 17 | C | 234 | 58 | 149 | — | 4520 |
| IE8 | | | 80 | 131 | M | 180 | 67 | 185 | — | 5030 |
| IE9 | | | 120 | 102 | A | 101 | 74 | 186 | — | 5400 |
| CE10 | | 0.80 | 60 | 560 | M | 123 | 67 | 188 | — | 196 |
| CE11 | | | 80 | 760 | M | 98 | 85 | 196 | — | 251 |
| CE12 | | | 120 | 920 | M | 67 | 92 | 200 | 560 | 26 |

TABLE 2

Adhesive data for base polymer P1 with UV crosslinker Esacure KIP 160 (2-hydroxy-1-{4-[4-(2-hydroxy-2-methylpropionyl)phenoxy]phenyl}-2-methylpropan-1-one, CAS No. 71868-15-0)

| Example | Crosslinker | Concentration [wt %] | Dose [mJ/cm²] | HP RT [min] | Fract. | MST max. [µm] | Elast. comp. [%] | SAFT [° C.] | SAFT [µm] | TFT [min] |
|---|---|---|---|---|---|---|---|---|---|---|
| CE13 | Esacure | 0.10 | 60 | <10 | K | 900 | 13 | <100 | — | 80 |
| CE14 | KIP 160 | | 80 | <10 | K | 820 | 23 | <100 | — | 160 |
| CE15 | | | 120 | <10 | K | 780 | 28 | <100 | — | 62 |
| IE16 | | 0.25 | 60 | 85 | M | 217 | 62 | 170 | — | 4805 |
| IE17 | | | 80 | 125 | A | 187 | 63 | 179 | — | 4280 |
| IE18 | | | 120 | 161 | A | 184 | 79 | 182 | — | 1620 |
| IE19 | | 0.50 | 60 | 23 | M | 178 | 59 | 181 | — | 3895 |
| IE20 | | | 80 | 50 | M | 146 | 51 | 189 | — | 4204 |
| IE21 | | | 120 | 140 | A | 79 | 85 | 200 | 542 | 1510 |
| CE22 | | 0.80 | 60 | 660 | A | 120 | 67 | 188 | — | 96 |
| CE23 | | | 80 | 1760 | A | 88 | 86 | 199 | — | 51 |
| CE24 | | | 120 | 2920 | A | 62 | 94 | 200 | 460 | 26 |

TABLE 3

Adhesive data for base polymer P1 with UV crosslinker Esacure KT 55 (mixture of 50 wt % Esacure KIP 150, 40 wt % 2,4,6-trimethylbenzophenone (CAS No. 954-16-5) and 10 wt % 4-methylbenzophenone (CAS No. 134-84-9))

| Example | Crosslinker | Concentration [wt %] | Dose [mJ/cm²] | HP RT [min] | Fract. | MST max. [µm] | Elast. comp. [%] | SAFT [° C.] | SAFT [µm] | TFT [min] |
|---|---|---|---|---|---|---|---|---|---|---|
| CE25 | Esacure | 0.10 | 60 | <10 | K | 780 | 26 | <100 | — | 80 |
| CE26 | KT 55 | | 80 | <10 | K | 620 | 34 | <100 | — | 78 |
| CE27 | | | 120 | <10 | K | 600 | 38 | <100 | — | 62 |
| IE28 | | 0.25 | 60 | 14 | M | 221 | 58 | 154 | — | 805 |
| CE29 | | | 80 | 54 | M | 128 | 71 | 200 | 825 | 280 |
| CE30 | | | 120 | 45 | A | 56 | 83 | 200 | 332 | 62 |
| IE31 | | 0.50 | 60 | <10 | K | 394 | 28 | 107 | — | 1023 |
| CE32 | | | 80 | <10 | M | 352 | 36 | 114 | — | 756 |
| CE33 | | | 120 | 17 | A | 106 | 64 | 200 | 569 | 152 |
| CE34 | | 0.80 | 60 | 160 | M | 120 | 67 | 188 | — | 196 |
| CE35 | | | 80 | 170 | A | 98 | 76 | 200 | 542 | 151 |
| CE36 | | | 120 | 172 | A | 92 | 77 | 200 | 457 | 26 |

TABLE 4

Adhesive data for base polymer P2 with UV crosslinker Esacure KIP 160 (2-Hydroxy-1-{4-[4-(2-hydroxy-2-methylpropionyl)phenoxy]phenyl}-2-methyl-propan-1-one, CAS No. 71868-15-0)

| Example | Cross-linker | Concentration [wt %] | Dose [mJ/cm$^2$] | HP RT [min] | HP Fract. | MST max. [µm] | Elast. comp. [%] | SAFT [° C.] | SAFT [µm] | TFT [min] |
|---|---|---|---|---|---|---|---|---|---|---|
| CE37 | Esacure | 0.10 | 60 | <10 | K | 810 | 24 | <100 | — | 120 |
| CE38 | KIP 160 |  | 80 | <10 | K | 720 | 27 | <100 | — | 280 |
| CE39 |  |  | 120 | <10 | K | 680 | 31 | <100 | — | 162 |
| IE40 |  | 0.25 | 60 | 85 | M | 187 | 54 | 180 | — | 4608 |
| IE41 |  |  | 80 | 115 | A | 126 | 62 | 189 | — | 5280 |
| IE42 |  |  | 120 | 141 | A | 84 | 63 | 192 | — | 1620 |
| IE43 |  | 0.50 | 60 | 23 | M | 158 | 51 | 181 | — | 4895 |
| IE44 |  |  | 80 | 54 | M | 116 | 59 | 189 | — | 4204 |
| IE45 |  |  | 120 | 129 | A | 79 | 65 | 200 | 448 | 1120 |
| CE46 |  | 0.80 | 60 | 260 | A | 120 | 67 | 188 | — | 96 |
| CE47 |  |  | 80 | 276 | A | 88 | 86 | 199 | — | 51 |
| CE48 |  |  | 120 | 292 | A | 62 | 94 | 200 | 360 | 26 |

TABLE 5

Adhesive data for base polymer P1 with UV crosslinker Esacure 1001 M (1-[4-(4-benzoylphenylsulfanyl)phenyl]-2-methyl-2-(4-methylphenylsulfonyl)propan-1-one)

| Example | Cross-linker | Concentration [wt %] | Dose [mJ/cm$^2$] | HP RT [min] | HP Fract. | MST max. [µm] | Elast. comp. [%] | SAFT [° C.] | SAFT [µm] | TFT [min] |
|---|---|---|---|---|---|---|---|---|---|---|
| CE49 | Esacure | 0.10 | 60 | <10 | K | >2000 | — | <100 | — | <10 |
| CE50 | 1001 M |  | 80 | <10 | K | >2000 | — | <100 | — | <10 |
| CE51 |  |  | 120 | <10 | K | >2000 | — | <100 | — | <10 |
| CE52 |  | 0.25 | 60 | <10 | K | >2000 | — | <100 | — | <10 |
| CE53 |  |  | 80 | <10 | K | >2000 | — | <100 | — | <10 |
| CE54 |  |  | 120 | <10 | K | >2000 | — | <100 | — | <10 |
| CE55 |  | 0.50 | 60 | <10 | K | >2000 | — | <100 | — | <10 |
| CE56 |  |  | 80 | <10 | K | >2000 | — | <100 | — | <10 |
| CE57 |  |  | 120 | <10 | K | >2000 | — | <100 | — | <10 |
| CE58 |  | 0.80 | 60 | <10 | K | >2000 | — | <100 | — | <10 |
| CE59 |  |  | 80 | <10 | K | >2000 | — | <100 | — | <10 |
| CE60 |  |  | 120 | <10 | K | >2000 | — | <100 | — | <10 |

The UV crosslinker Esacure 1001 M ((1-[4-(4-benzoylphenylsulfanyl)phenyl]-2-methyl-2-(4-methylphenylsulfonyl) propan-1-one, CAS No. 272460-97-6) is not suitable for the crosslinking of the acrylate-based pressure-sensitive adhesives.

TABLE 6 tan δ values for the inventive and comparative examples 1 to 60, measured by means of dynamic mechanical analysis (frequency sweep) at ω = 0.1 rad/s and 25° C.

| Example | tan δ$^1$ |
|---|---|
| CE1 | 0.62 |
| CE2 | 0.61 |
| CE3 | 0.60 |
| IE4 | 0.50 |
| IE5 | 0.49 |
| IE6 | 0.49 |
| IE7 | 0.49 |
| IE8 | 0.48 |
| IE9 | 0.47 |
| CE10 | 0.44 |
| CE11 | 0.44 |
| CE12 | 0.43 |
| CE13 | 0.58 |
| CE14 | 0.56 |
| CE15 | 0.52 |
| IE16 | 0.49 |
| IE17 | 0.47 |
| IE18 | 0.45 |
| IE19 | 0.48 |
| IE20 | 0.46 |
| IE21 | 0.45 |
| CE22 | 0.44 |
| CE23 | 0.42 |
| CE24 | 0.41 |
| CE25 | 0.53 |
| CE26 | 0.52 |
| CE27 | 0.51 |
| IE28 | 0.46 |
| CE29 | 0.44 |
| CE30 | 0.43 |
| IE31 | 0.47 |
| CE32 | 0.44 |
| CE33 | 0.42 |
| CE34 | 0.44 |
| CE35 | 0.43 |
| CE36 | 0.42 |

TABLE 6-continued tan δ values for the inventive and comparative examples
1 to 60, measured by means of dynamic mechanical analysis
(frequency sweep) at ω = 0.1 rad/s and 25° C.

| Example | tan δ[1] |
|---|---|
| CE37 | 0.54 |
| CE38 | 0.54 |
| CE39 | 0.53 |
| IE40 | 0.50 |
| IE41 | 0.48 |
| IE42 | 0.46 |
| IE43 | 0.49 |
| IE44 | 0.47 |
| IE45 | 0.45 |
| CE46 | 0.44 |
| CE47 | 0.42 |
| CE48 | 0.42 |
| CE49 | 0.65 |
| CE50 | 0.64 |
| CE51 | 0.63 |
| CE52 | 0.63 |
| CE53 | 0.62 |
| CE54 | 0.61 |
| CE55 | 0.59 |
| CE56 | 0.57 |
| CE57 | 0.56 |
| CE58 | 0.56 |
| CE59 | 0.55 |
| CE60 | 0.53 |

[1] = measured by means of dynamic mechanical analysis (frequency sweep) at 25° C. and ω = 0.1 rad/s, stress 2500 Pa Surprisingly, and not obviously for the skilled person, adhesives having good flagging properties (measurable through the TFT test) can be obtained using photoinitiators (i.e. UV crosslinkers) having at least two photoactive groups per molecule, if a balanced ratio is set between cohesion and adhesion. This is evident in particular from the rheological properties and specifically the tan δ (the ratio of G" to G', in other words the ratio of loss modulus to storage modulus), which with a measuring frequency of 0.1 rad/s (corresponding approximately to the timescale of the flagging process) adopts values, with particular preference, of between $0.45 \leq \tan \delta \leq 0.50$ (see Table 6). The aforesaid bonding agents are particularly suitable for the adhesive bonding of cylindrical surfaces.

The invention claimed is:

1. Adhesive comprising polymerization products of acrylates, the adhesive being meltable, wherein it comprises at least one polymerization product synthesized from a) 75 to 99.9 wt % of esters of (meth)acrylic acid of the general formula I,

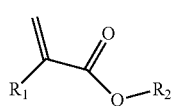
(I)

wherein $R_1$=H or $CH_3$ and $R_2$ is a linear, branched or cyclic alkyl chain having 2 to 20 C atoms, b) 0.1 to 25 wt % of (meth)acrylic acid of the formula II,

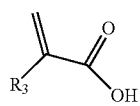
(II)

where $R_3$=H or $CH_3$,
and the sum of all the components used makes 100 wt % of the polymerization product, the polymerization product having a molecular weight Mn greater than 50 000 g/mol and Mw greater than 500 000 g/mol, and wherein tan δ, the ratio of loss modulus G" to storage modulus G", is between $0.45 \leq \tan \delta \leq 0.50$ for a measuring frequency of 0.1 rad/s.

2. Adhesive according to claim 1, wherein it further comprises c) olefinically unsaturated monomers having functional groups and/or d) olefinically unsaturated monomers which are copolymerizable with component (a) and/or (b).

3. Adhesive according to claim 1, wherein the polymerization product has a static glass transition temperature ($T_g$) of less than or equal to 0° C.

4. Adhesive according to claim 1, wherein the polymerization product comprises (a) 80 to 99.9 wt % of esters of (meth)acrylic acid of the general formula I, (b) 0.1 to 20 wt % of (meth)acrylic acid of the formula II, (c) 0 to 10 wt % of olefinically unsaturated monomers having functional groups, (d) 0 to 10 wt % of olefinically unsaturated monomers, the sum of all of the components used making 100 wt %.

5. Adhesive according to claim 1, wherein the polymerization product has a residual monomer content of less than or equal to 1 wt % in respect of the overall composition of the adhesive.

6. Adhesive according to claim 1, wherein the K value is greater than or equal to 40.

7. Adhesive according to claim 1, wherein the polydispersity Q of the polymerization product, where Q=Mw/Mn, is greater than or equal to 5.

8. Pressure-sensitive adhesive wherein the pressure-sensitive adhesive is UV-crosslinkable and meltable and comprises a) an adhesive according to claim 1, and b) at least one photoinitiator selected from the group consisting of α-cleavers, benzophenone derivatives and thioxanthone derivatives.

9. Pressure-sensitive adhesive according to claim 8, wherein the α-cleaver is selected from the group consisting of α-hydroxy ketones and derivatives thereof.

10. Pressure-sensitive adhesive according to claim 9, wherein a) the α-cleaver is selected from the group consisting of oligo[2-hydroxy-2-methyl-1-[4-(1-methylvinyl)phenyl]propanone], 2-hydroxy-1-{4-[4-(2-hydroxy-2-methyl-propionyl) phenoxy]phenyl}-2-methyl-propan-1-one, 2,4,6-trimethylbenzophenone and also mixtures comprising at least two of the aforesaid α-cleavers.

11. Pressure-sensitive adhesive according to claim 10, wherein the amount of at least one α-cleaver in the overall composition of the adhesive is 0.25 to 0.75 wt %.

12. Process for preparing the pressure-sensitive adhesive according to claim 8, by mixing (i) an adhesive comprising at least one polymerization product synthesized from (a) 75 to 99.9 wt % of esters of (meth)acrylic acid of the formula I,

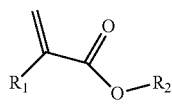

where $R_1$=H or $CH_3$ and $R_2$ is an alkyl chain having 2 to 20 C atoms and (b) 0.1 to 25 wt % of (meth)acrylic acid of the formula II,

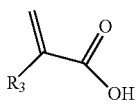

where $R_3$=H or $CH_3$, and the sum of all the components used makes 100 wt % of the polymerization product, the polymerization product having a molecular weight Mn of greater than 50.000 g/mol and Mw of greater than 500 000 g/mol, with (ii) at least one photoinitiator selected from the group consisting of α-cleavers and benzophenone derivatives.

13. Pressure-sensitive adhesive obtained by a process according to claim 12.

14. Method for producing a bonding agent, a transfer adhesive, an adhesive transfer tape, a coated carrier, or an adhesive tape, where the meltable pressure-sensitive adhesive of claim 8 is discharged as a melt in the temperature range from 60 to 200° C.

with a coatweight of 20 to 250 g/cm³ to give a layer which is optionally applied to a carrier or to a transfer medium, and the layer is crosslinked with high-energy radiation.

15. Method according to claim 14, the application of adhesive taking place in the form of a uniform layer with a layer thickness of 2 to 200 µm, with optional application of the layer to a carrier or to a transfer medium.

16. Method according to claim 15, the adhesive being applied to a carrier or to a transfer medium selected from woven fabric, nonwoven fabric, film and paper.

17. Bonding agent obtained by the method of claim 14.

18. Bonding agent according to claim 17, wherein the TFT (Threshold Flagging Time) in minutes is greater than or equal to 1000 minutes.

19. Bonding agent according to claim 18, wherein it has a holding power (HP) of greater than or equal to 100 minutes under standard conditions (23° C., 55% humidity), the holding power being measured in minutes as the time taken for the adhesive tape to detach fully from the substrate.

20. Bonding agent according to claim 19 in the form of a flat bonding agent or in the form of a carrier or a transfer medium coated with a UV-crosslinked pressure-sensitive adhesive, the bonding agent being a flat bonding agent selected from the group consisting of a label, adhesive tape, cable wrapping tape, protective sheet, flat transfer adhesive and an adhesive transfer tape.

21. Flat bonding agent according to claim 19, wherein it is an adhesive tape comprising a textile carrier.

* * * * *